United States Patent
Strub

(10) Patent No.: US 8,168,285 B2
(45) Date of Patent: May 1, 2012

(54) JOINED COMPONENT, IN PARTICULAR A PILOT BOSS FOR A FORCE TRANSFER DEVICE, METHOD FOR MANUFACTURE OF A CONTINUOUS MATERIAL CONNECTION AND A FORCE TRANSFER DEVICE

(75) Inventor: Yannick Strub, Souffleheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 979 days.

(21) Appl. No.: 12/069,138

(22) Filed: Feb. 7, 2008

(65) Prior Publication Data
US 2008/0210666 A1 Sep. 4, 2008

(30) Foreign Application Priority Data

Feb. 8, 2007 (DE) .......................... 10 2007 006 269

(51) Int. Cl.
*B32B 3/30* (2006.01)

(52) U.S. Cl. .......................................... 428/156; 428/60
(58) Field of Classification Search .................... 428/60, 428/156
See application file for complete search history.

(56) References Cited

U.S. PATENT DOCUMENTS 4,919,987 A * 4/1990 Manner ........................... 428/60
5,269,917 A * 12/1993 Stankowski .................. 210/232

* cited by examiner

*Primary Examiner* — Alexander Thomas
(74) *Attorney, Agent, or Firm* — Simpson & Simpson, PLLC

(57) ABSTRACT

A joined component, in particular a rotation symmetrical component for connecting to another second joined component into a unit for creating a continuous material, non-disengageable connection through compression welding, comprising a joined surface and a joint portion, provided at the joined surface, for contacting the other, second joined component. A recess for receiving weld bead material is provided at the joined surface around the joint portion.

11 Claims, 4 Drawing Sheets

JOINED COMPONENT, IN PARTICULAR A PILOT BOSS FOR A FORCE TRANSFER DEVICE, METHOD FOR MANUFACTURE OF A CONTINUOUS MATERIAL CONNECTION AND A FORCE TRANSFER DEVICE

CROSS-REFEENCE TO RELATED APPLICATIONS

This patent claims priority of German Patent Application No. 10 2007 006 269.0, filed Feb. 8, 2007, which application is incorporated herein by reference.

FIELD OF THE INVENTION

The invention relates to a joined component, in particular a pilot boss for connecting to an additional second joined component, in particular a cover element of a unit, by means of a continuous material connection through compression welding, which cannot be disengaged. Further, the invention relates to a method for manufacturing a continuous material connection for joining two joined components by means of compression welding, and to a force transfer device, comprising a component made from two joined components.

BACKGROUND OF THE INVENTION

Compression welding methods, in particular resistance welding methods, are characterized in that the joints of the components to be joined are locally transformed into a deformable state by means of heat input, and connected amongst each other in a plastic manner through the impact of pressure. The heat input can be effectuated in different ways. Preferably electrical energy is used, wherein the materials are locally heated up to welding temperature at the contact spot by means of the electrical resistance when the current passes through. However, using ultrasound and friction heat is also feasible. Depending on the method used for establishing the connection, the heat input for increasing the temperature in the welding zone can lead to a temperature in the range of the melting temperature or also below. Thus, one of the two components can be provided with a so-called welding hump, formed as a protrusion, wherein a surface compression of the two components to be joined is performed in this portion, and the joint is mostly produced by deforming the material of the welding hump, and by diffusion with the material of the component to be joined in the welding area. In highly stressed components, the contact pressure and the thermal energy have to be configured to generate the required burn-in, which, by definition, leads to forming a bead at the rim of the weld connection through the material deformed and displaced from the welding area being deposited. Such joints are often used for rotationally fixated continuous material and non-disengageable connections between rotatable components, in particular rotation symmetric components, which are connected amongst each other by butt joints. One application is, e.g., a force transfer device, comprising a hydrodynamic speed/torque converter, in which the primary shell functioning as a pump shell can be connected with the input or a drive unit, in particular a combustion engine, wherein the coupling is performed by a housing component, formed as a housing cover. The centering and support are performed by means of a pinion, which is received in a pilot bore in the crankshaft of the combustion engine. This pinion is also designated as pilot and connected non-rotationally with the housing component, in particular the cover, wherein the connection is performed by a welding method. During the operation of such force transfer devices, the pilot is put under a bending load. The maximum stress occurs at the rim of the welded connection, where the geometric notch of the weld bead creates a stress concentration. Such notches decrease the fatigue strength of the unit thus formed, in particular of the connection.

SUMMARY OF THE INVENTION

Therefore it is a general object of the invention to refine a welded connection of two components, in particular between a pilot boss and a component, in particular a housing component of a force transfer device, so that a stress concentration at the rim of the welded connection is avoided, in particular, so that the weld bead caused by the welding process, which acts as a notch, is reduced.

The terms employed in the subsequent description are based on the following definitions:

Joined portion: the connection portion between two components, which is characterized by the continuous material connection;

Overlapping portion: the portion characterized by the contact, and/or the abutment of the components to be connected, or, in case of no direct contact, their desired arrangement with continuous material connection amongst each other, when positioned for the welding method;

Joint location: surface segments or portions of the opposing and contacting surfaces of the components positioned for the welding method, which are to connected amongst each other by means of the continuous material connection; and, Thermal impact zone: the portion, in which the microstructure of the components to be connected is influenced through the input of thermal energy.

A joined component, in particular a rotation symmetrical element, formed as a pinion, for establishing a continuous material connection, which cannot be disengaged, through welding together with another second joined component into a unit, comprises a joined surface having at least one joint surface portion, wherein the joined component is typically characterized in that at the joining surface, preferably around the joint portion, a bead chamber for receiving welding bead material, is provided, which is formed by a recess, or one or several protrusions at the joined surface.

When the joined component is provided as a rotation symmetrical element, in particular a pinion, the forming of the recess is performed in the portion of the outer circumference at the front face of the joined component, forming the joined surface. The solution according to the invention allows the provision of additional volume to receive the welding bead, otherwise exiting from the joining portion, when joining with another joined component, comprised of material, which is displaced and not used for the continuous material connection, and pressed out of the overlapping portion.

The joint portion can be formed by the entire joined surface, or at least by one welding hump, forming a protrusion at the joined surface. In this case, the arrangement of the bead chamber is performed at the welding hump. When the joined component is provided as a rotationally symmetrical component, wherein the joined surface is formed by at least one surface area at a front face of the rotation symmetrical component, and the joint portion is formed by an annular protrusion forming the welding hump, disposed at this front face, the weld bead chamber extends in a circular manner in circumferential direction around said protrusion. The weld bead chamber is then disposed between the joint portion and the outer circumference of the joined component, forming an also circular punch at the joined component, pushing back the material displaced in radial direction towards the outer circumference into the welding portion upon sinking in, or establishing the continuous material connection. The protrusion forming the welding hump is located on the joined surface as far as possible in the portion of the outer circumference of the joined component, in order to assure a large surface connection, wherein the welding bead chamber is preferably directly adjacent to the protrusion forming the joint portion.

According to a particularly preferred embodiment, the bead chamber extends into the area of the outer circumference of the joined component. This means the depth of the weld bead chamber decreases in the direction towards the outer circumference of the joined component, while forming the punch in the area of the outer circumference, wherein the bead chamber is characterized by at least two surface portions, a first surface portion, disposed adjacent to the joint portion, and a second surface portion adjacent to the first surface portion and extending in the direction to the outer circumference of the joined component. According to a particularly advantageous embodiment, the recess receiving the weld bead is formed, so that it is provided concave. Due to this concave embodiment, deformed and displaced material is pressed back radially inward into the joined portion. Therefore, it remains in a melted state longer and it is progressively compressed, in order to fill the existing chamber. Since it is required in order to assure a connection, which is as solid as possible to completely fill the chamber, the geometry and the volume are adapted according to the invention to the volume of the weld bead created. The volume of the bead chamber is thus a function of the volume of the material displaced during the welding process, and not required for the continuous material connection, wherein said volume can in turn be determined as a function of the welding parameters.

According to a first embodiment, the first and the second surface portions are provided planar and disposed at an angle relative to each other, forming a groove, whose cross section is triangular, wherein the second surface portion forms a wedge area.

According to a second embodiment, the second surface portion has a concave camber, wherein the camber can be described by one or several radiuses. The first surface portion is configured in both cases parallel to the center axis of the joined component, and perpendicular to the joined surface. Furthermore, there is also the possibility to provide the first surface area cambered, preferably also concave. When a curvature radius of a respective size is selected, a certain type of undercut can also be created in the bead chamber, additionally acting like a hook in the weld joint and improving its strength.

The bead chamber can thus either extend directly, or almost directly, into the portion of the outer circumference of the joined component or it can end at a preferably small distance from it. The first possibility thus offers the advantage that over the entire joined surface, integrating the bead chamber, an optimum connection is assured, extending over the entire joined surface at the first joined component.

According to another particularly advantageous embodiment, the recess for optimizing the size of the joined portion is directly adjacent to the joint portion. An arrangement, which is offset from the joined portion, is also conceivable here.

In a particularly advantageous embodiment, this is a joined component, provided in the form of a rotation symmetrical pinion element in the form of a pilot boss, wherein the connection to another joined component in the form of a housing component, in order to form a unit, is performed in the portion of the joined surface.

The method according to the invention for producing a continuous material connection is characterized in that one of the two joined components is provided with at least one bead chamber, manufactured around the joint portion, wherein the bead chamber is preferably manufactured in the form of a recess at the joined surface at the joined component, forming a punch element provided in the portion of the outer circumference, wherein the bead chamber is dimensioned with respect to its size, so that it receives the weld bead, created in particular by the deformation of the protrusion, provided as a welding bump during the welding process. The recess can be provided as a channel, or as a groove. The bead chamber is thus preferably disposed at the joined surface of the smaller joined component.

A joined component according to the invention is thus used preferably in a force transfer device, in particular in a hydrodynamic apparatus, in which it is provided as a pilot boss, connected non-rotationally to a housing component, wherein the connection is a continuous material connection, and performed by welding, so it cannot be disengaged. For welding methods, thus compression welding methods, in particular a resistance welding method or a friction welding method is used. Other possibilities are also feasible.

BRIEF DESCRIPTION OF THE DRAWINGS

The solution according to the invention is subsequently described based on figures. Therein, the following is illustrated in particular:

FIGS. 1-1a illustrates a particularly advantageous embodiment of a joined component according to the invention, with a bead chamber, which is triangular in cross section, in a schematically simplified illustration, based on a detail from an axial sectional view;

FIGS. 1b to 1d illustrate further theoretically possible embodiments for bead chambers according to a detail according to FIG. 1a;

DETAILED DESCRIPTION OF THE INVENTION

Figure 2A:
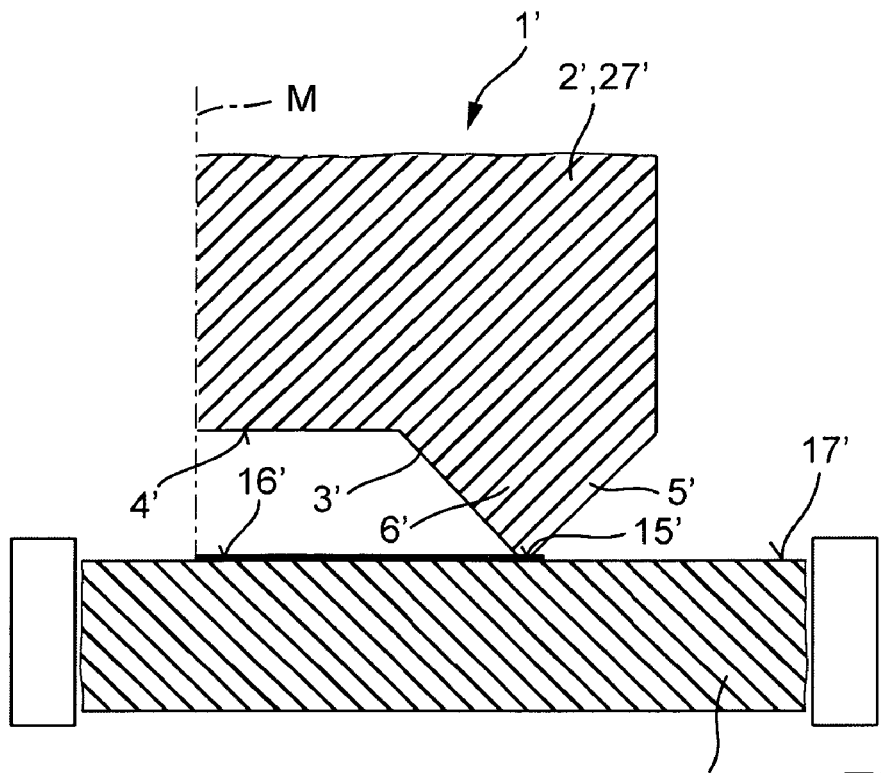
FIGS. 2a and 2b illustrate the disadvantages of the state of the art, based on the positioning of the particular joined components before the welding process and their disposition after the welding process in the unit.
Figure 2B:
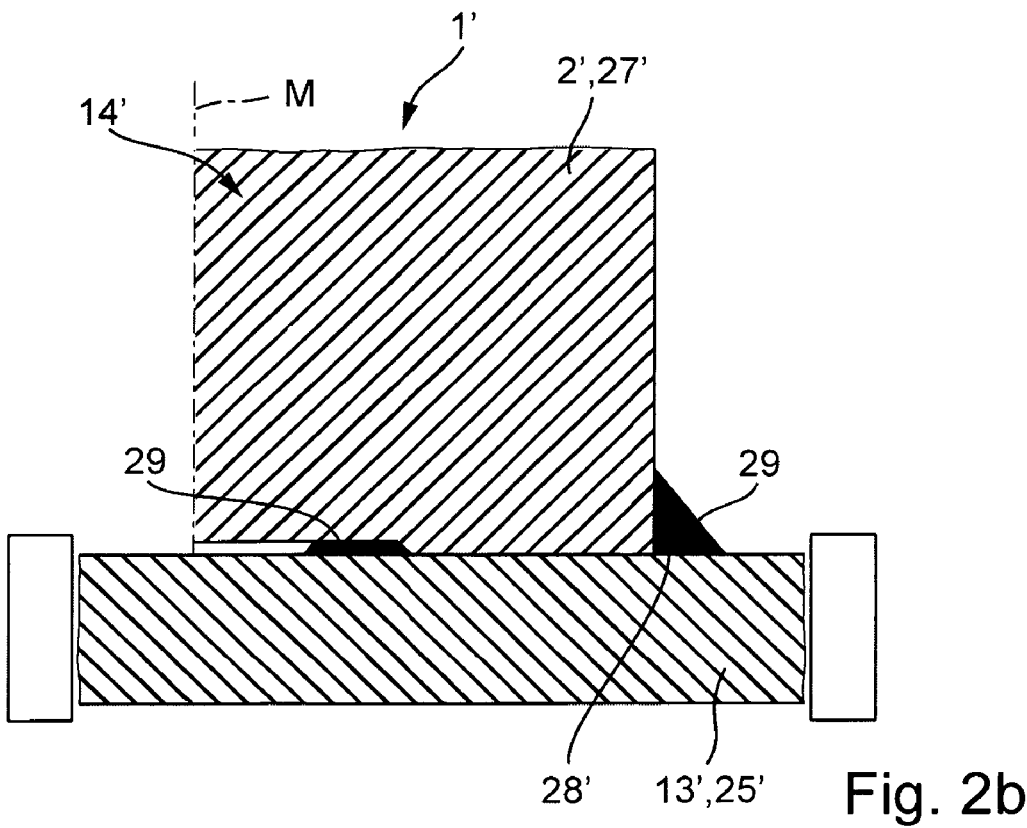

FIGS. 2a and 2b illustrate the problems incurred during joining in a simplified schematic illustration, in particular welding of two joined components 1 and 13 according to the state of the art by means of a butt joint by means of a compression welding process, as it is used, e.g., for creating a continuous material, non-disengageable connection between pilot bearing 27 and an element of a force transfer device, in particular cover element 25 of a torque converter housing. Thus, the positioning of two joined components 1 and 13 before the welding process is illustrated in FIG. 2a, and component 14 formed there from is illustrated after the welding process in FIG. 2b. Therefrom, joined component 1, here as a rotation symmetric element provided as pinion 2, and second joined component 13, which, is, e.g., formed by a housing component of a hydrodynamic speed/torque converter, are evident. Joined surface 3 at joined component 1 is substantially formed by the surface portions, present at front face 4, in consideration of the surface portions of annular protrusion 6. Protrusion 6 in the form of weld hump 5 thus is used for forming joint portion 15. Therein, the contact before and during the welding process is performed with joined surface 16 at second joined component 13. Both joined components 1 and 13 are disposed relative to each other in a butt joint, this means front face 4 abuts to front face 17 of second joined component 13. Under temperature increase and pressure, a softening and deformation occurs with a plastic merge between joined component 1 in the portion of joined surface 3 and second joined component 13. For this purpose, in this case, weld hump 5, in particular protrusion 6 and the portions proximal to the surface are locally transformed into a kneadable state through heat input at joined component 13, and plastically merged through the pressure. Depending on the embodiment, a heat input can be performed up to reaching the melting temperature, but also below it. Displaced material 29 is pressed on the radial inside towards center axis M, due to the configuration, and to the radial outside relative to center axis M of first joined component 1, and enters into a continuous material connection with second joined component 13. One component is deposited in the portion of outer circumference 11 of first joined component 1, and at second joined component 13 with a randomly formed geometry as a bulge, wherein this accumulation, which is also designated as bead 28, constitutes a notch as illustrated in FIG. 2b for unit 14 provided after the welding process. In order to avoid this disadvantage, first joined component 1 is provided according to the invention with bead chamber 7 for receiving bead 28. Chamber 7 is preferably always associated with the smaller work piece, in particular to the work piece with the smaller joined surface.

Figure 1A:
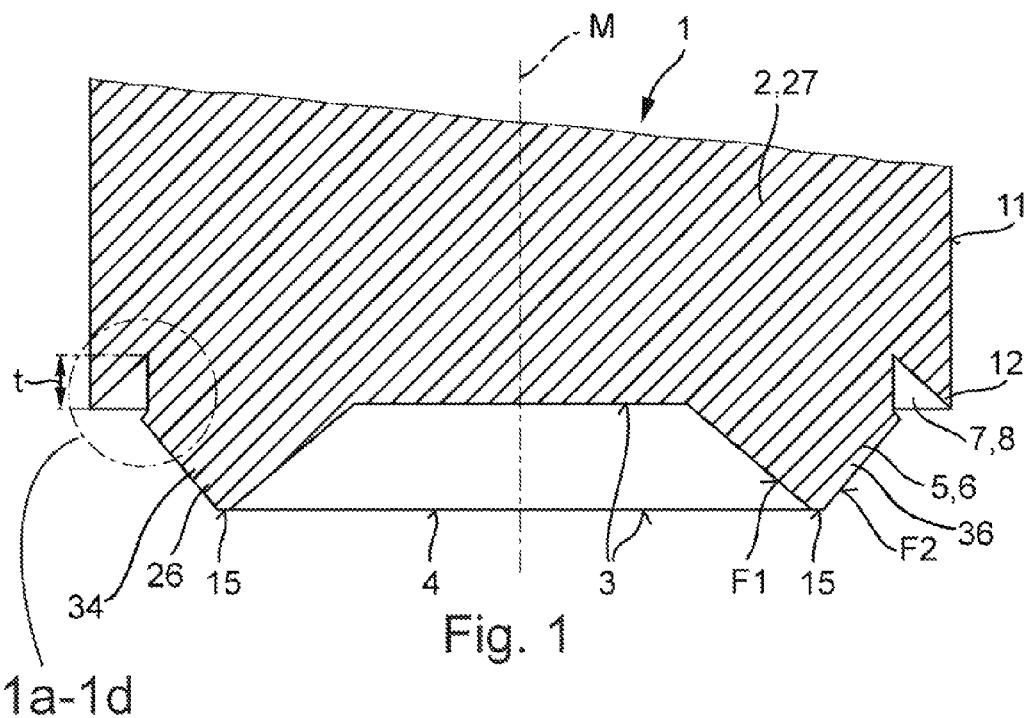
Figure 1A:
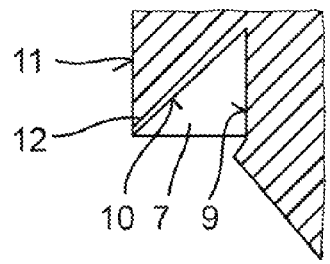

FIG. 1a illustrates a particularly advantageous embodiment of joined component 1, provided according to the invention in a schematically simplified illustration, based on an axial cut view. Joined component 1 is preferably provided as a rotation symmetrical component, in particular provided in the form of pinion 2, in particular as pilot boss 27 for a force transfer device. It furthermore comprises at least one joined surface 3, which is defined as the surface portion, which is used for the continuous material connection with the other additional second joined component, not shown in FIG. 1a, for establishing a continuous material connection through compression welding by means of a butt joint. Joined surface 3 is formed by face side 4 of pinion 2. The continuous material, non-disengageable connection through welding is created by a pressure welding method. Joined surface 3 at joined component 1 is provided not completely planar for this purpose, but it comprises weld hump 5 in the form of protrusion 6, extending in an annular manner around center axis M of joined component 1, which is disposed offset from outer circumference 11 of joined component 1. Protrusion 6 is preferably tooth-shaped, this means it is characterized by two flanks F1 and F2, viewed away from joined surface 3. Protrusion 6 thus tapers in the direction away from joined surface 3. Contacting the component to be joined during the welding process is performed at protrusion 6. Crown portion 26 of protrusion 6, in particular the crown of the tooth thus forms joint portion 15, thus the portion of joined surface 3, which is provided to be brought into contact in a butt joint with the joined surface at the component to be joined, when positioned before the welding process. In order to obtain an even seam, protrusion 6 is provided annular, this means rotation symmetric with reference to center axis M. Thus, in the cross sectional view of FIG. 1, protrusions 6 forms protrusions 34 and 36.

The welding method which is provided in the form of a compression welding method is based on the butt joints, or butt joint portions 15 of the components to be joined, being locally transformed into a deformable, in particular kneadable, state through heat input and plastically merged through pressure. The easiest way to generate the thermal energy is electric energy, in particular through resistive heating. Other forms of energy are also possible, e.g., ultrasound, or friction heat. Since butt joint 15 is formed by protrusion 6, shaped as welding hump 5, the thermal input and the conversion into a deformable state is substantially also performed in this portion, wherein through the deformation in the portion of protrusion 6 a merger between the two components to be joined occurs in the portion of their joined surfaces. Compression welding is typically performed without a welding additive through pressure impact. However, deformed material is pressed in the direction towards center axis M, and to outer circumference 11, forming a continuous material connection with the material of the second joined component. In order to avoid a leakage from the joined portion, a chamber is provided at joined portion 1 in circumferential direction according to the invention around protrusion 6 forming joint 15, which is used for receiving weld bead 28. The chamber is also designated as weld bead chamber 7 and extends in circumferential direction around weld hump 5 and thus around the welding area. This is used for avoiding the leakage of weld bead material from the overlapping portion of the two joined portions. Weld bead chamber 7 is provided, so that it defines recess 8 at joined surface 3 and recess 8 is aligned opposite to protrusion 6, wherein recess 8 extends in radial direction from center axis M to the radial outside, reducing depth t in this direction. Recess 8 or bead chamber 7 thus forms punch 12, disposed offset from weld hump 5 at the joined component, which is provided in this case in the portion of exterior circumference 11, and since weld bead chamber 7 extends in an annular manner, is also annular. Punch 12 forms a wedge surface, and effectuates a pushback of the displaced material therewith into the welding zone, and thus a longer continuance in said welding zone.

Recess 8 is provided in the simplest case as a channel or as a groove and preferably characterized by a concave embodiment. Recess 8 forming weld bead chamber 7 can be characterized by at least two surface portions 9 and 10, wherein first surface area 9 connects to protrusion 6, forming joint 15, and second surface portion 10 connects first surface portion 9 and second surface portion 10 extends into the portion of outer circumference 11 of joined component 1. Preferably it extends directly to outer circumference 11. Thus, a preferably triangular embodiment of weld bead chamber 7 is realized. Punch 12, thus created at the exterior circumference of joined surface 3 is formed by an annular half tooth. First surface portion 9 preferably extends parallel to center axis M, while second surface portions 10 extends from surface portion 9 with a distance from joined surface 3 in the direction of joined portion 3 radially towards to the outside towards outer circumference 11. The configuration of second surface portion 10 is also preferably planar in this case.

Figure 1B:
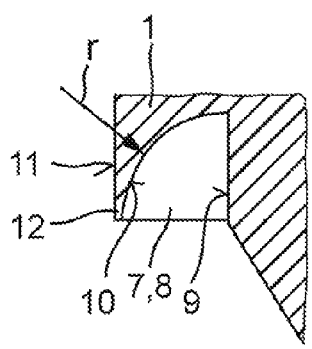
Figure 1C:
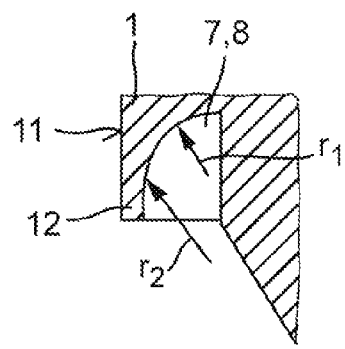
Figure 1D:
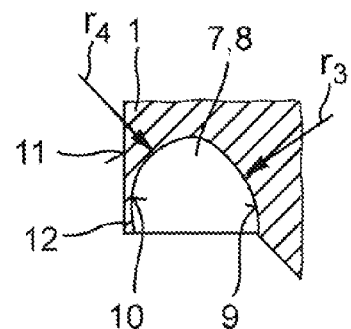

Cambered embodiments, at least of surface portion 10, are also feasible as described in FIGS. 1b through 1d in an exemplary manner, based on a detail from an axial sectional view of joined component 1. It is important that surface portion 10 forms punch 12, expanding from joined surface 3, wherein second surface portion 10 forms a wedge in the direction of the effect of the pressure forces when producing a non-disengageable continuous material connection, and receiving the weld bead material from weld hump 5 and compresses it in weld bead chamber 7 due to the geometric configuration.

FIG. 1b illustrates a possible embodiment as a variant of FIG. 1a with a cambered embodiment of second surface portion 10. Here it forms punch 12 in the portion of outer circumference 11 of joined component 1. Weld bead chamber 7 becomes smaller in the direction away from joint portion 15, where punch 12 is formed. Thus, second surface portion 10 can be described through single radius r, as illustrated in an exemplary manner in FIG. 1b.

Providing second surface portion 10 with several different radii r1 and r2 is also feasible. Thus, the geometry of weld bead chamber 7 can be influenced further. Such an embodiment is illustrated in an exemplary manner in FIG. 1c. Therein, surface portion 10 is characterized in an exemplary manner by two radii r1 and r2.

FIGS. 1a through 1c illustrate embodiments with parallel first surface portion 9 towards the center axis. FIG. 1d illustrates in an exemplary manner an embodiment of recess 8 forming weld bead chamber 7, with cambered surface portions 9 and 10, viewed in circumferential direction, wherein single surface portions 9 and 10 are preferably also provided differently and oriented differently. First surface portion 9 is thus characterized by radius r3, larger than radius r4 of second surface portion 10. Thereby, substantially the same effect is accomplished, as in FIG. 1a. In case of a stronger inclination, or camber, a pocket shaped recess can be realized, expanding weld bead chamber 7 in the direction towards center axis M, and thus further increasing the receiving volume. In this case, r3, or a combination of different radii can be provided, so that the material is imparted into recess 8 by means of punch 12, also, wherein the recess acts like an undercut, at which the deformed material accumulates on both sides.

Figure 3A:
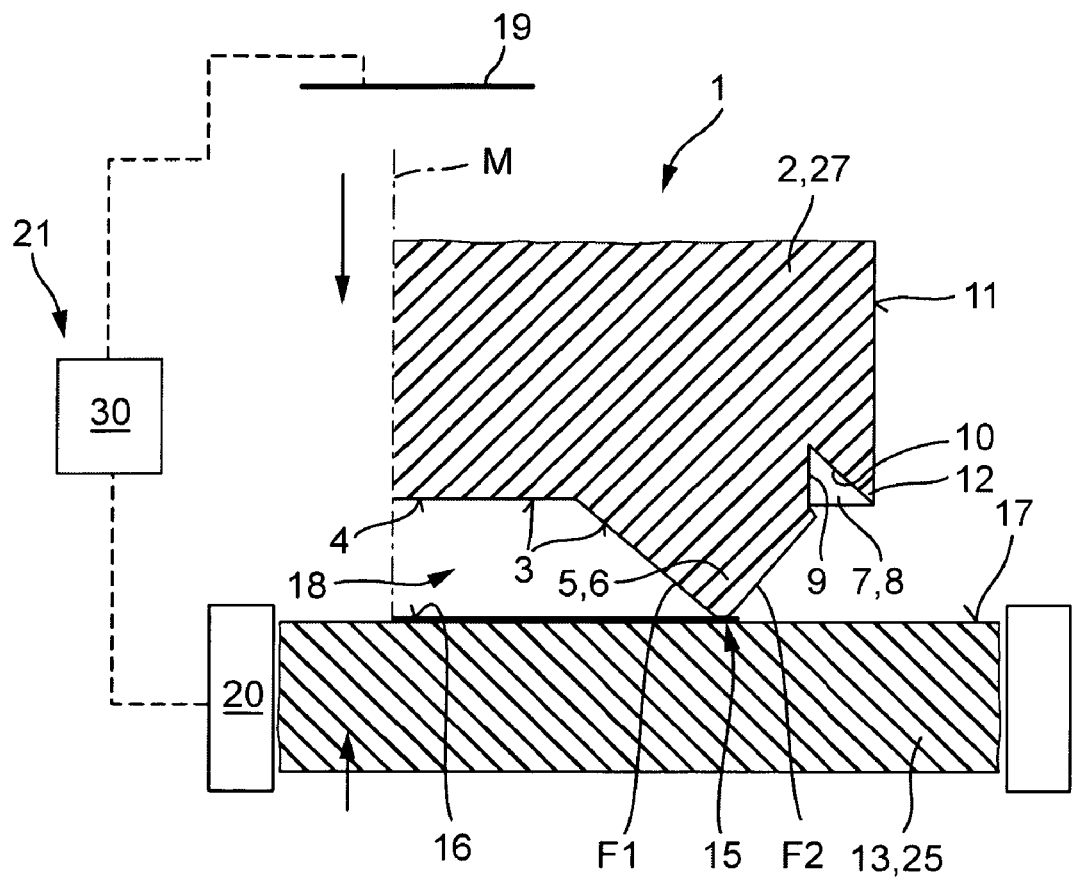
FIGS. 3a and 3b illustrate the method according to the invention and the function of the joined component provided according to the invention, based on the positioning of the particular joined components before the welding process, and their disposition after the welding process in the unit; and, FIG. 4 illustrates a particularly advantageous use of a continuous material, non-disengageable connection, manufactured according to the invention.
Figure 3B:
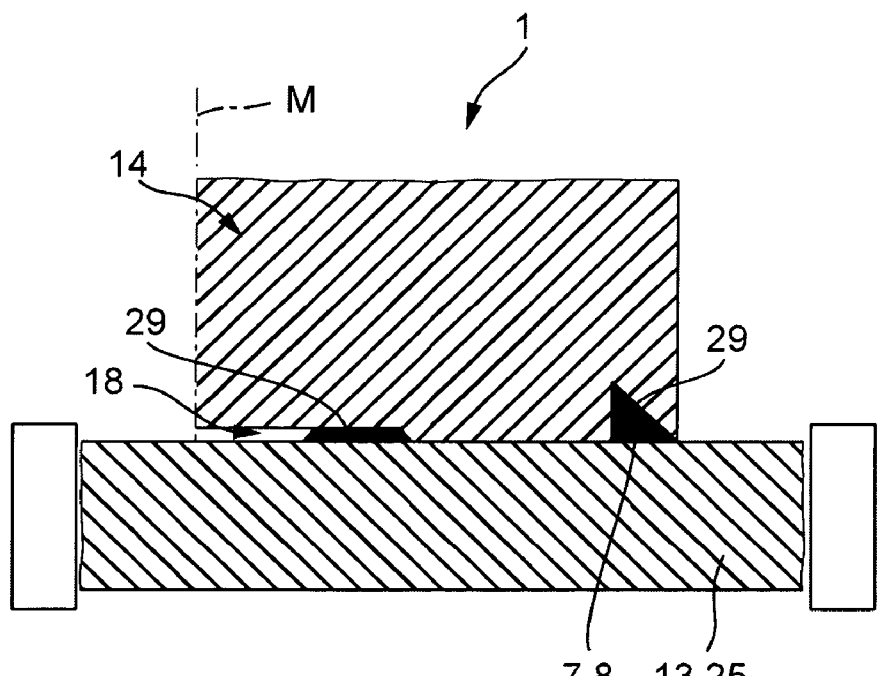

The method according to the invention is illustrated in FIG. 3a with reference to positioning particular joined components 1 and 13 relative to each other, before the actual welding process, and component 14 provided after the connection and after the welding process is illustrated in FIG. 3b. FIG. 3a illustrates the positioning of two joined components 1, 13, in particular provided as pinion 2, or as pilot boss 27 and a housing component, in particular as cover 26 according to FIG. 2a. Also here, the joined portions, or joined surfaces 3 and 16 are illustrated, furthermore, joint portion 15, in particular the contact portion before welding, which is substantially smaller than actual joined surface 3 or 16, and thus smaller than the joined portion, which is designated 18 in this case. Furthermore, weld bead chamber 7 is visible, which is disposed around the joint portion in joined surface 3, in the form of recess 8 at first joined component 1. FIG. 3a and FIG. 1 thus illustrate a particularly advantageous embodiment of protrusion 6, in particular of welding hump 5, with a cross section extending from face side 4 in a tapered manner, and provided in the form of an annular tooth at front face 4. Bead chamber 7 is provided in an opposite direction in joined surface 3 of pinion 2, forming punch 12 with a concave punch surface.

As discussed, the actual welding can be performed by various methods. Thus, at the pinion, and also at second joined component 13, a respective power source can be connected, in order to create local heating. Both, first joined component 1 and second joined component 13, are disposed in a butt joint relative to each other. The pressure can either be imparted onto one of two joined components 1 or 13 or preferably onto both. This is illustrated by arrows in the illustrated case in an exemplary manner. Furthermore, the embodiment of a resistance welding method is shown. The heating is performed by direct current and energy input through welding electrodes, in this case, e.g., 19 and 20. Thus, preferably a material is selected as an electrode material, which does not react with the components to be joined, in particular with the joined components 1 and 13. The melting heat is created through a short term effect of a strong current through the high transition resistance in the component. The welding device, comprising two electrodes 19 and 20, and at least one current source 30, is designated with 21 in this case. This embodiment of welding device 21, in particular the disposition of the welding electrodes is exemplary. Other embodiments are feasible. The establishment of the continuous material connection is preferably performed under a simultaneous or time wise only partially overlapping impact of heat and pressure, wherein the force can be imparted onto only one of the two components 1 or 13 to be joined, or it can be imparted onto both against each other.

It is evident in the illustration of component 14 according to FIG. 3b after the welding process that the weld bead displaced by melting or deformation is mostly located in weld bead chamber 7, and thus does not reach beyond the joined area, or only minimally reaches beyond the joined area, whereby only a reduced notch effect is still created.

FIG. 3a illustrates a possible embodiment. Furthermore, the compression welding method used can also be another method, e.g., a pure friction welding method. This depends on the respective welding parameters.

The geometry and the volume of bead chamber 7 are determined as a function of the weld bead material to be absorbed, and mostly depend on the size of welding hump 5. The actual embodiment thus furthermore depends on the welding method used and on the displacement of the welding aggregate generated thereby.

Figure 4:
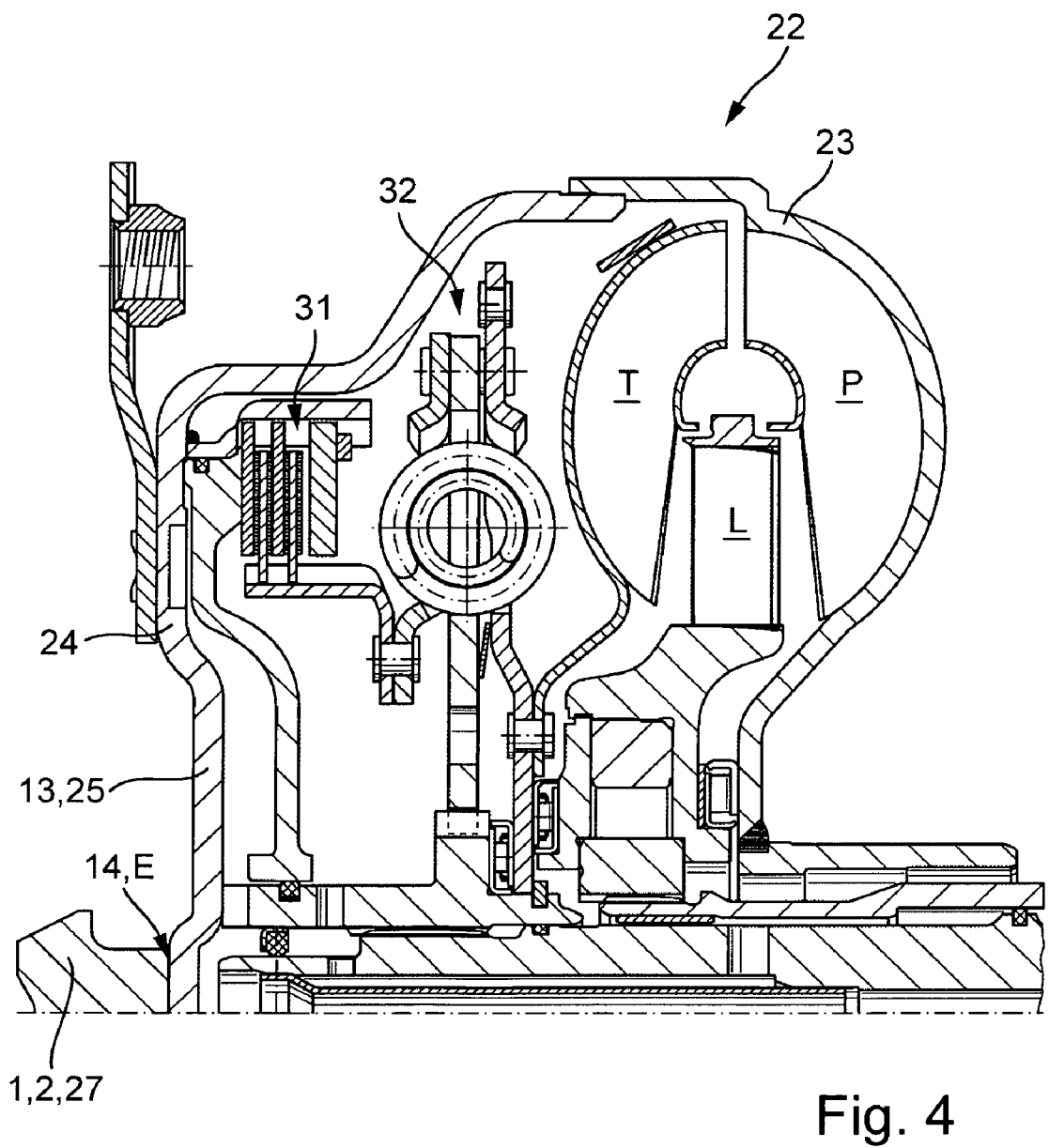

FIG. 4 illustrates a particularly advantageous embodiment of the method according to the invention, based on an axial sectional view in a schematically simplified illustration for joining two joined components 1, 13 into unit 14. Unit 14 thus forms input E of force transfer device 22, comprising a hydrodynamic component, in particular hydrodynamic speed/torque converter 23, comprising a primary shell acting as pump shell P, which is connected non-rotationally to input E. This is realized through housing component 24. Housing component 24 is thus formed by second joined component 13 and is provided in the form of cover 25. First joined component 1 thus forms pilot boss 2 for pump shell P, in particular cover 25 which is also designated as pilot boss 27. Force transfer device 22 can also be a hydrodynamic component, or a multifunctional unit with a hydrodynamic component, actuatable clutch 31 associated therewith, in particular a lockup clutch, and possibly device 32 for damping vibrations.

The solution according to the invention is not confined to the illustrated application, wherein this application, however, illustrates a particularly advantageous application. Its use is feasible for any application with durability problems, where the risk of an exit of weld bead material and the creation of notch effects is an issue. In a particularly advantageous manner, the solution according to the invention is usable for manufacturing continuous material non-disengageable connections between two preferably rotatable components for the establishing a non-rotational connection, in particular for connecting a pinion designated as a pilot boss to a converter cover, wherein the components are associated with each other in a butt joint and the connection thus established is additionally suitable for bearing bending loads.

REFERENCE NUMBERS 1 joined component
2 pinion 3 joined surface
4 front face
5 welding hump
6 protrusion
7 chamber
8 recess
9 first surface portion
10 second surface portion
11 outer circumference
12 punch
13 second joined component
14 unit
15 joint
16 joined surface
17 front face
18 joined portion
19 first electrode
20 second electrode
21 welding device
22 force transfer device
23 hydrodynamic speed/torque converter
24 housing component
25 cover
26 head piece
27 pilot boss
28 bead
29 displaced material
30 power source
31 actuatable clutch
32 vibration damping device
P pump shell
F1 flank
F2 flank
F force
M central axis

What is claimed is:

1. A first component, for connecting with a second component into a unit for establishing a continuous material, non-disengageable connection by means of compression welding, comprising:
   a center axis;
   first and second surfaces forming respective outer edges of the first component; and,
   a third surface, connecting the first and second surfaces, arranged to be joined to a fourth surface for the second component, and including:
      in a cross section of the first component passing through the center axis, first and second protrusions formed by first and second sides of a welding hump converging at a distal end, the distal end forming a portion of the first component extending furthest in a first direction parallel to the center axis;
      a recess with a planar surface connected to the respective first sides of the first and second protrusions of the welding hump and extending in a second direction, perpendicular the first direction, the center axis passing through the planar surface; and,
      a bead chamber:
         extending in the second direction, between the first surface and the second side for the first welding hump;
         at least partially formed by a third side extending toward the first surface; and for receiving weld bead material.

2. The first component recited in claim 1 wherein said first component is a pilot boss.

3. The first component as recited in claim 1, wherein said first component is provided as a rotation symmetrical component, wherein the welding hump is annular in shape, and wherein the bead chamber extends circumferentially about the first component.

4. The first component as recited in claim 1, wherein the bead chamber directly abuts the welding hump.

5. The first component as recited in claim 1, wherein a depth (t) of the bead chamber decreases in a direction towards the second surface, forming a punch (12) with the second surface, and the bead chamber includes a fourth side connected to the third side.

6. The first component as recited in claim 5, wherein the third and fourth sides are planar, and disposed at an angle relative to each other, forming a groove, which is triangular in cross section.

7. The first component as recited in claim 5, wherein the fourth side is aligned in parallel to the center axis of the first component and orthogonal to the third surface.

8. The first component as recited in claim 5, wherein at least a partial portion of the fourth side is cambered concave.

9. The first component as recited in claim 8, wherein the camber of the fourth side includes at least one radius.

10. The first component as recited in claim 1, wherein the volume of the bead chamber is determined as a function of the welding bead.

11. The first component as recited in claim 1, wherein said first component is provided as a pinion (2) of a pilot boss (27) for non-rotational coupling with a housing component.

* * * * *